Figure 1:
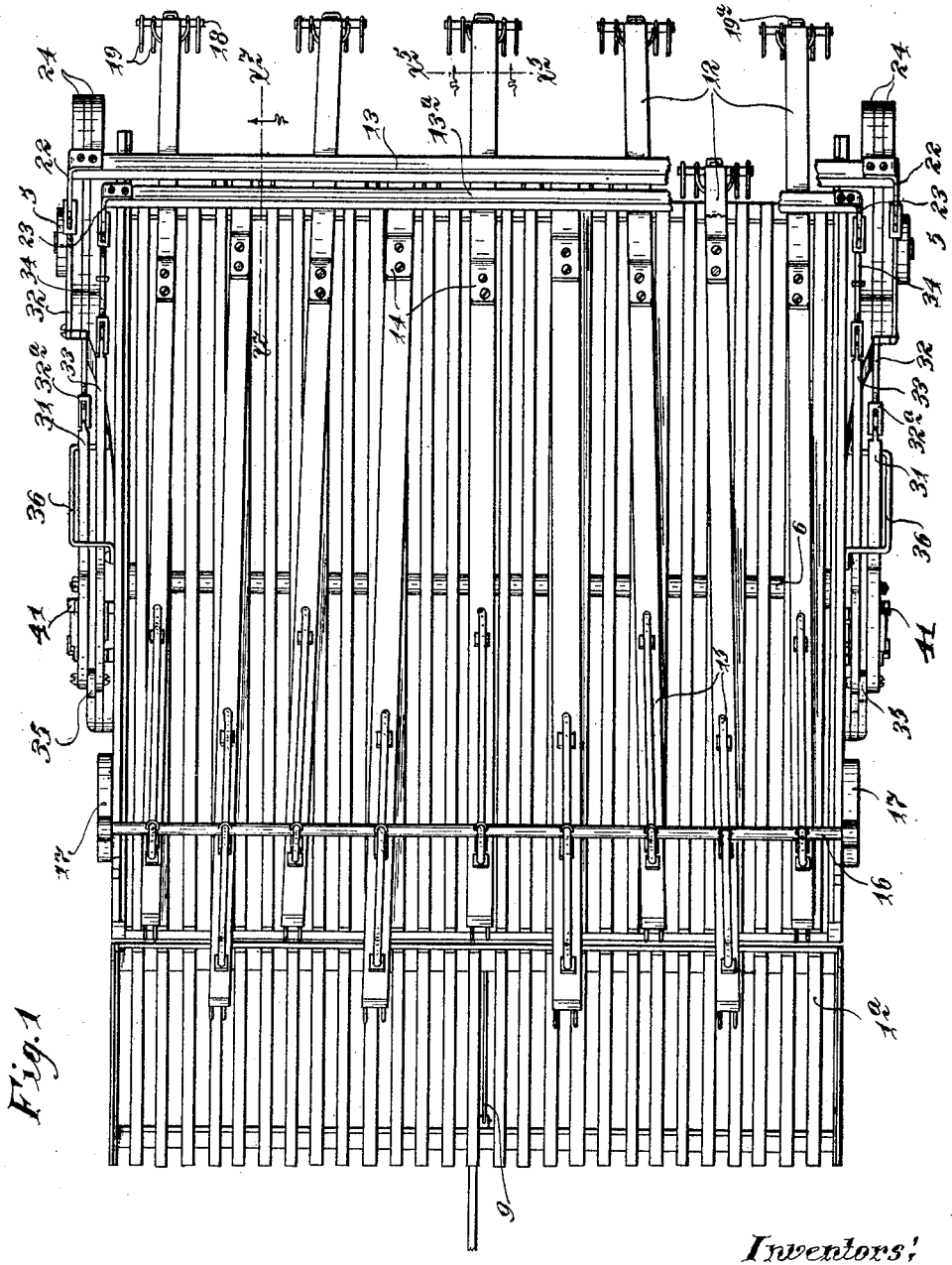

M. G. HARRIS, N. P. RASMUSSON & W. C. INGLETHRON.
HAY LOADER.
APPLICATION FILED SEPT. 20, 1911.

1,086,597.

Patented Feb. 10, 1914.

5 SHEETS—SHEET 1.

Witnesses:
Geo Knutson
A. H. Opsahl.

Inventors:
Myron G. Harris
Neils P. Rasmusson
William C. Inglethron
By their Attorneys;
Williamson & Merchant M. G. HARRIS, N. P. RASMUSSON & W. C. INGLETHRON.
HAY LOADER.
APPLICATION FILED SEPT. 20, 1911.
1,086,597.
Patented Feb. 10, 1914.
5 SHEETS—SHEET 2.
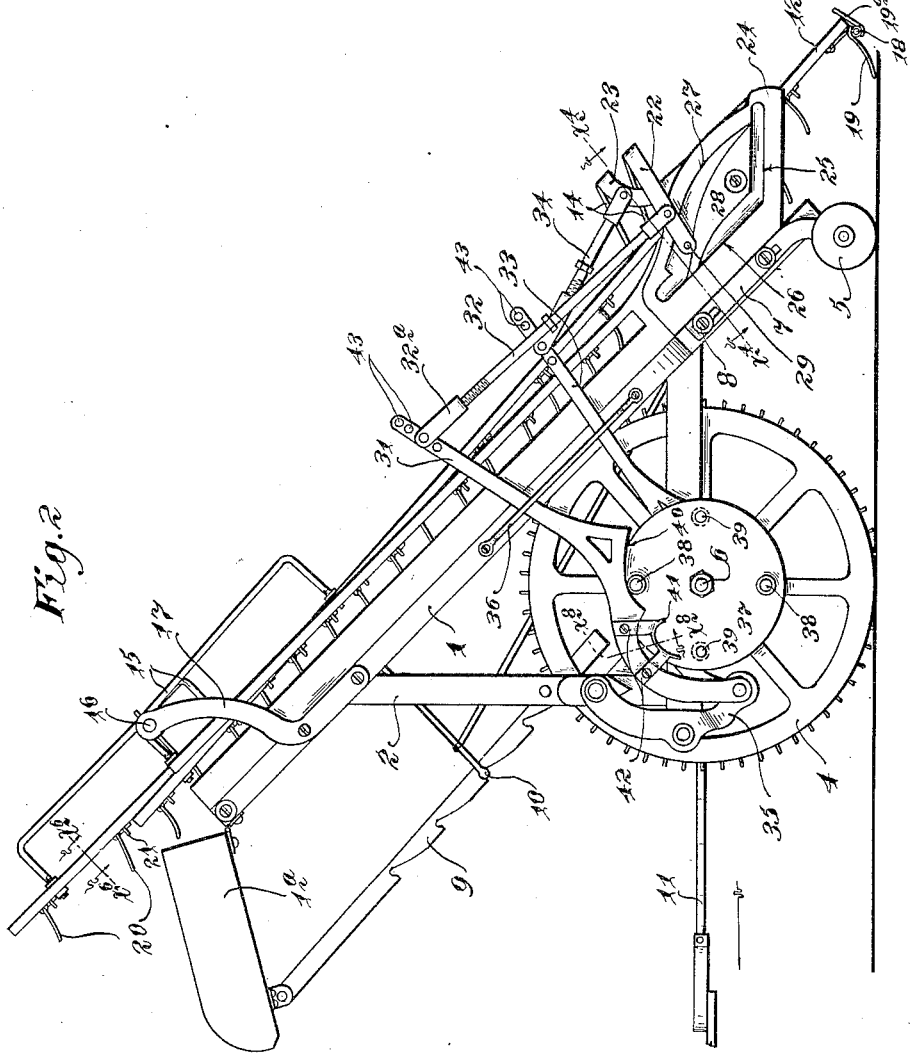
Witnesses
Geo. Knutson
A. H. Opsahl
Inventors;
Myron G. Harris
Neils P. Rasmusson
William C. Inglethron
By their Attorneys;
Williamson Merchant

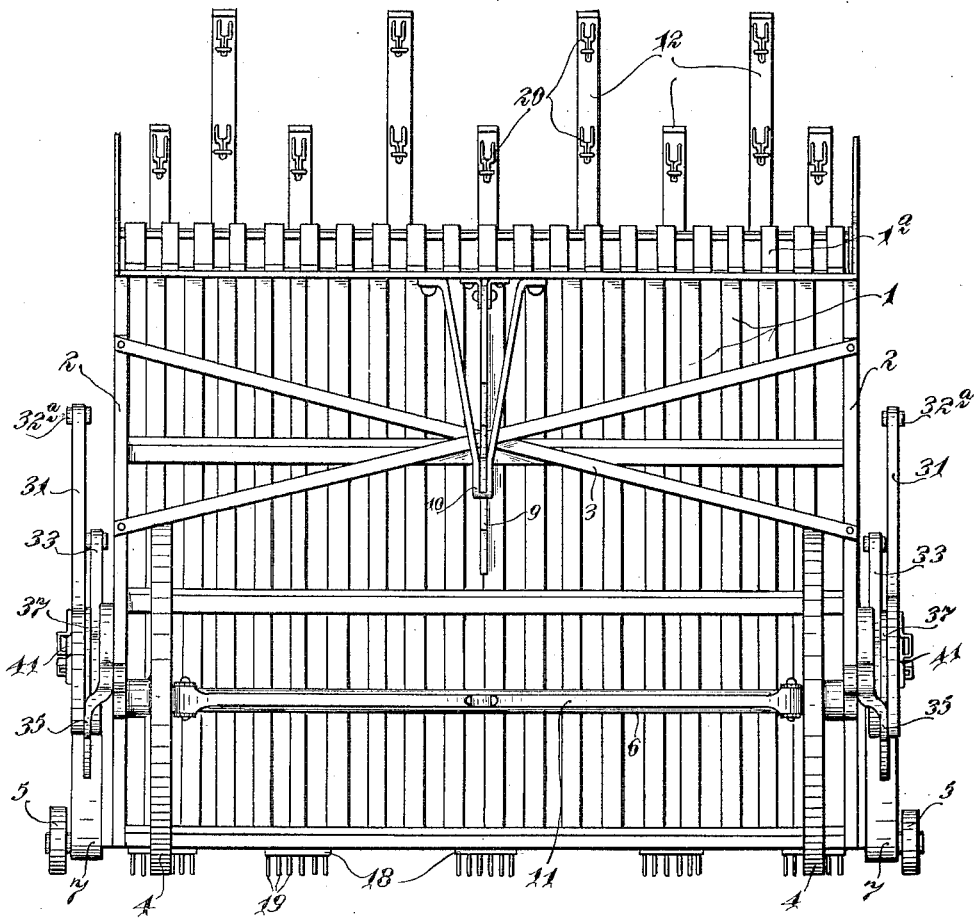

M. G. HARRIS, N. P. RASMUSSON & W. C. INGLETHRON.
HAY LOADER.
APPLICATION FILED SEPT. 20, 1911.
1,086,597.
Patented Feb. 10, 1914.
5 SHEETS—SHEET 4.
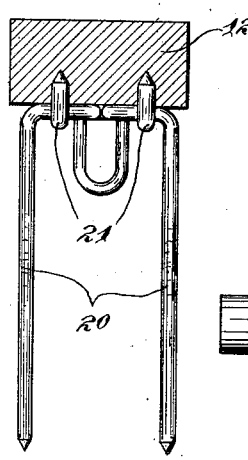
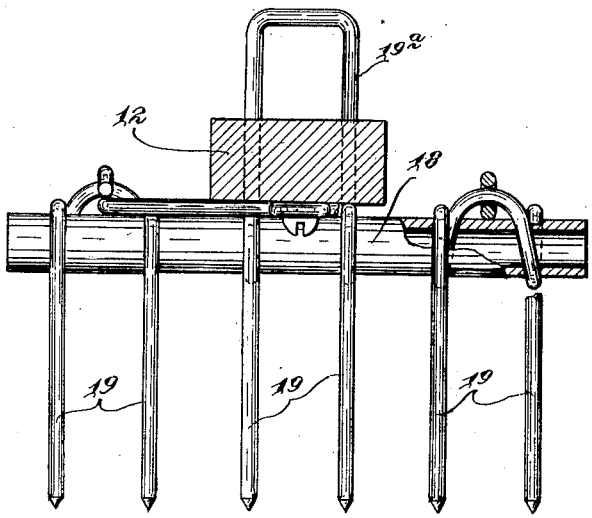
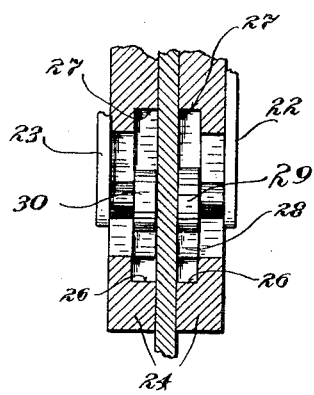
Witnesses:
Geo Knutson
A. H. Opsahl
Inventors:
Myron G. Harris
Neils P. Rasmusson
William C. Inglethron
By their Attorneys
Williamson Merchant M. G. HARRIS, N. P. RASMUSSON & W. C. INGLETHRON.
HAY LOADER.
APPLICATION FILED SEPT. 20, 1911.
1,086,597. Patented Feb. 10, 1914.
5 SHEETS—SHEET 5.
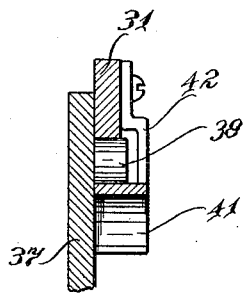
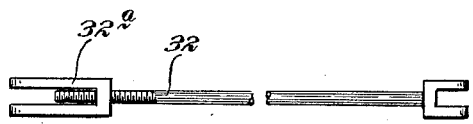
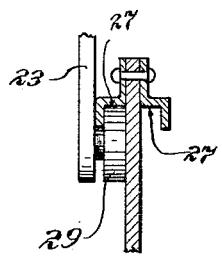
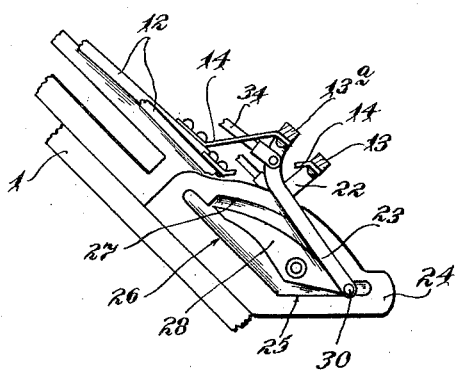
Witnesses:
Geo. Knutson
A. H. Opsahl
Inventors:
Myron G. Harris
Nels P. Rasmusson
William C. Inglethron
By their Attorneys;
Williamson Merchant

UNITED STATES PATENT OFFICE.

MYRON G. HARRIS, NEILS P. RASMUSSON, AND WILLIAM C. INGLETHRON, OF CEDAR FALLS, IOWA, ASSIGNORS TO HARRIS & COLE BROS., OF CEDAR FALLS, IOWA, A CORPORATION OF IOWA.

HAY-LOADER.

1,086,597.  Specification of Letters Patent.  Patented Feb. 10, 1914.

Application filed September 20, 1911. Serial No. 650,401.

*To all whom it may concern:*

Be it known that we, MYRON G. HARRIS, NEILS P. RASMUSSON, and WILLIAM C. INGLETHRON, citizens of the United States, residing at Cedar Falls, in the State of Iowa, have invented certain new and useful Improvements in Hay-Loaders; and we do hereby declare the following to be a full, clear, and exact description of the invention, such as will enable others skilled in the art to which it appertains to make and use the same.

This invention relates particularly to that type of hay loader wherein the truck which carries the loader mechanism is adapted to be hitched behind a wagon, and, under forward movement of the wagon, will pick up the hay or loose grain and deliver the same into the wagon.

The invention has for its object to generally improve the construction and operation of loaders of this type, and, generally stated, it consists of the novel devices and combinations of devices hereinafter described and defined in the claims.

The improved loader is illustrated in the accompanying drawings wherein like characters indicate like parts throughout the several views.

Referring to the drawings, Figure 1 is a plan view showing the complete loader; Fig. 2 is a side elevation of the loader; Fig. 3 is a front elevation of the machine; Fig. 4 is a detail in section taken on the line $x^4$ $x^4$ of Fig. 2; Fig. 5 is a detail in section taken on the line $x^5$ $x^5$ of Fig. 1, some parts being broken away; Fig. 6 is a detail in section taken approximately on the line $x^6$ $x^6$ of Fig. 2; Fig. 7 is a detail in vertical section taken on the line $x^7$ $x^7$ of Fig. 1, some parts being broken away; Fig. 8 is a detail in section on the line $x^8$ $x^8$ of Fig. 2, some parts being broken away; and Fig. 9 is a fragmentary view corresponding to Fig. 4 but illustrating a slightly modified construction. Fig. 10 is a plan view of one of the connecting rods.

The framework of the machine is made chiefly of an inclined slatted deck 1, side brackets 2, and a cross tie 3. This frame is carried by relatively large traction wheels 4 and small idle rear wheels 5. The traction wheels 4 are rigidly secured to a heavy transverse driving axle 6 that is journaled in suitable bearings in the rear portions of the side brackets 2. The wheels 5 are journaled to the lower end of arms 7, which, as shown, are rigidly but adjustably secured to the lower side portions of the inclined deck 1, by means of bolts 8, working through slots of the said arms. At its upper delivery end, the slatted deck 1 is provided with a hinged segmental section 1ª that is capable of vertical adjustments, as shown, by means of a ratchet bar 9 pivoted thereto, and engageable with a yoke 10, rigidly secured to the under side of the deck 1.

The loader is adapted to be hitched to the rear portion of a wagon or hay rack, and for this purpose, is provided with a rearwardly diverging draft bar 11, the rear ends of which are loosely pivoted on the axle 6. Both the main inclined deck 1 and its supplemental section 1ª are provided with the customary upwardly projecting side boards for preventing hay or grain from running over the sides thereof.

The improved machine is adapted to pick up the hay or loose grain from the ground. The hay or loose grain is then carried upward over the inclined deck, by means of vibratory rake bars 12 that are arranged in two sets or series, with the members of the one side alternated in respect to the other, and means is provided for simultaneously oscillating two sets of bars in longitudinal reverse directions so that the continuously acting feed device is afforded. One set of these rake bars is connected to a transverse tie bar 13 and the other set is connected to a similar transverse tie bar 13ª. The connection between the said rake bars 12 and tie bars 13—13ª is preferably made by spring metal straps 14 that are inclined in respect to the plane of the deck 1 and to the operative planes of the said rake bars, so that a yielding connection between the said rake bars and tie bars is afforded.

At their upper ends, the rake bars 12 are provided with guide yokes 15 that extend over and loosely embrace a transverse guide rod 16, rigidly connected to the sides of the upper portion of the inclined deck 1, by means of arms 17. These yokes 15 and guide rods 16 are secured to the upper ends of the rake bars with freedom for a considerable range of movement toward and away from the upper portion of the inclined deck 1. The yokes 15, while they guide the upper ends of the bars 12, permit such lateral movements thereof, as may be required to cause the said bars to adapt themselves to the varying thickness of the hay or grain which is fed upward over the deck 1.

At the extreme lower ends, the rake bars 12 are provided with toothed rake heads shown as made up of transverse bars 18 and spring tines 19 applied thereto. The outer pair of tines 19 are shown as passed through perforations in the bars 18, but the central pair of tines are shown as provided with intermediate connection portion 19ª that operates as a spring and bears against the extreme end of the coöperating bar 12. These rake heads are, therefore, mounted so that they will yield when the rake bars are forced toward the ground, and they serve as the gathering members or rakes of the bars for directly picking the hay or loose grain from the ground, all of which will hereinafter more fully appear. At suitable intervals along their under surfaces, the said rake bars 12 are provided with rake teeth 20, shown as formed in pairs and pivotally connected to the said bars by staples 21 so that the said teeth are operative under upward movements of the rake bars but turn freely backward under downward movement of the said rake bars.

The rake tie bar 13 is provided with downwardly extended arms 22, while the ends of the rake tie bar 13ª are provided with forwardly and downwardly extended arms 23. The arms 22 are located considerably farther outward than the arms 23. The arms 22 work on the outer sides and the arms 23 on the inner sides of cam heads or plates 24, which are rigidly secured to the lower ends of the sides of the platform 1. Both in their inner and outer faces, the cam plates 24 are recessed or otherwise constructed so that they are formed with connected cam surfaces 25, 26 and 27. These cam surfaces are in approximately triangular relation in respect to each other. Located in each recess, or for coöperation with each of the said sets of cam surfaces 25, 26 and 27, is an approximately triangular cam acting switch plate 28. These switch plates 28 are normally yieldingly held in the position shown in Fig. 2, either by the action of gravity or by a spring. The arms 22 of the rake tie bar 13 are provided at their lower ends with inwardly projecting studs 29 that are preferably equipped with rollers. Likewise, the arms 23 of the rake tie bar 13ª is provided with outwardly projecting studs 30 that are preferably roller-equipped. The roller-equipped studs 29 coöperate with the outer cam surfaces 25, 26 and 27 and outer switch plates 28, while the rollers 30, likewise, coöperate with the inner cam surfaces 25, 26 and 27 and inner switch plates 28. The cam surface 25, it is important to note, extends horizontally or parallel to the ground. The purpose of this and the operation of the cam surfaces above noted will be made clear in the description of the operation.

The arms 22 of the rake tie bar 13 are connected to the upper ends of the operating rake operating levers 31, by means of connecting rods 32. These connecting rods 32 are preferably made longitudinally adjustable by threading one end of each rod 32 and engaging the threaded ends thereof with bifurcated heads 32ª which, as shown, are directly pivoted to the upper ends of the said levers 31, the lower ends of the said rods 32 being provided with fixed bifurcated heads that are pivotally connected to the arms 22. It is evident that the said adjustable connecting rods will maintain any adjustment in which they are set. The arms 23 of the rake tie bars 13ª are connected to the upper ends of the rake operating levers 33, by means of connecting rods 34 which preferably are of the same construction as the rods 32, except that they are shorter. It will thus be seen that the levers 31 and 33 are arranged in pairs at the opposite sides of the machine with the said levers 31 outward of the said levers 33. At their lower ends, the levers 31 and 33 are pivoted to bearings 35 rigidly secured to the rear lower portions of the frame brackets 2. Guide straps 36 on the sides of the inclined deck 1, hold the upper portion of the levers 31 and 33 against too great lateral displacement. The levers 31 and 33 are given approximately simultaneous movements in reverse directions, by cam acting crank devices carried by the driving axle 6, and which devices may take various forms but, as preferably constructed, include disk-like wheels 37 secured to the extreme ends of the axle 6 and working between the adjacent levers 31 and 33.

The so-called cam wheels 37 are provided on their outer faces with diametrically opposite cam studs or pins 38, and on their inner faces, they are provided with similar diametrically opposite cam studs or pins 39, which pairs of cam studs are set about ninety degrees, the one ahead of the other. The said cam studs 38 and 39 impart upward movements to the levers 31 and 33, respectively, by engagement with cam surfaces 40 of the said levers, and they operate with gravity, but to insure downward movements of the said levers, they engage, respectively, with curved cam flanges 41 that have lateral off-set arms 42 rigidly secured to the said levers.

The operation of the machine is substantially as follows: Under forward movement of the machine, in the direction of the arrow marked on Fig. 2, the laterally spaced pair of levers 31 and 33 will be vibrated in alternate order, that is, the one pair will be moved upward while the other pair is being moved downward, and this, as is evident, imparts alternate reciprocating movements to the two sets of the rake bars 12. The upward movements of the rake bars is, as already indicated, caused by engagement of the cam studs 38 and 39 with the cam surfaces 40 of the levers 31—33, and the reverse or downward movements, which tend to take place under action of gravity are insured by engagement of the said cam studs with the cam flanges 41 of the said levers. Also, it will be noted, that each set of rake bars will be given two complete oscillations under each rotation of the traction wheels 4. The action of both sets of cam devices 25, 26, 27, and 28 on the rake bars is identical, hence, a detailed description of one, thereof, will suffice for both. When, for instance, the rake tie bar 13 is moved downward, the cam studs 30 of its arm 22 will ride over the pivoted switch plates 28 and the rake heads 19 at the lower ends of the rake bars 12 will be raised and moved over the hay or loose grain that is to be picked up. When the said cam studs 30 reach the rear extremities of the cam surfaces 27, they drop into engagement with the horizontal cam surfaces 25, and when the forward movement of the said rake bars takes place, the said cam studs will move horizontally forward along the said cam ways 25 and thus move the points of the rake heads 19 horizontally over the ground and thereby insure the picking up of a full load and clean raking of the ground. Then when the said cam studs 30 move up the inclined runways 26, the rake teeth will deliver the hay onto the receiving end of the inclined deck 1, and the alternately acting rake bars will continue the upward movement of the hay or loose grain to the upper end of the said deck where it will be discharged over the adjustable deck section 1ª onto the rack. When the rake bars are moved downward the rollers 30 will move over the switch plates 28 and the rake bars will be raised at their lower ends and carried over the hay next to be picked up thereby. The cam studs 38 and 39, when engaging the cam flanges 41, operate upon the levers 31 at points closer to their pivots than when engaging the flange 40, and hence, downward movements of the rake bars will be much more rapid than the upward movements thereof. While the movements of the two sets of rake bars are alternate, nevertheless, the cam studs 38 operate upon the cam surfaces 40 of the levers 31 for such length of time that the extreme downward movements of one set of rake bars will take place while the other set of rake bars are being given their final, or last portion of their upward movement. Hence, the initial downward movement of the one set of rake bars will always take place while the other set of rake bars are moving upward, and this facilitates the transfer of the hay from the teeth of the one set of rakes to the teeth of the other set of rakes. More particularly stated, the downward movement along the camway 27 and the forward movement along the horizontal camway 25 take place approximately while the other set of rakes is passing up its incline 26, and, for approximately one-third of the time required for movement around the complete course or camway, both sets of rakes move upward together. This insures rapid delivery of the hay or grain off from the deck, and prevents the hay from clogging on the deck. The horizontal runways or tracks 23 are of such forward and rearward extent, and the time of movements of the levers 31—33 are such, that when the rake heads 19 of the one set of rake bars are engaged with the ground, they will engage the ground at points on a transverse line at least as far back as the transverse line from which the rake heads 19 of the other set of rake bars are picked from the ground. This produces a continuous raking action on the ground on which there are no gaps or spaces covered with hay which are skipped or jumped over by the rake heads. This, as is obvious, is important, because it insures clean raking of the ground. The longitudinal adjustments of the connecting rods 32—34 make it an easy matter to properly set the rake bars in respect to the levers 31—33, and to the endless runways or tracks in which the rollers 29 and 30 travel, as above described. Adjustments for the proper travel or extent of runway movements of the rake bars is, as shown, arranged for by providing the levers 31—33 in their free ends with several longitudinally spaced perforations 43, to which the coöperating rods 32—34 may be pivotally connected.

The device, while especially designed and particularly adapted for use as a hay loader, is, nevertheless, not only capable of use, but highly efficient in its use as a machine for picking up any and all kinds of loose grain, or straw, from the ground, and loading the same into a wagon or onto a rack.

What we claim is:

1. In a machine of the kind described, the combination with a truck and movable rake bars carried thereby, of means for reciprocating said rake bars, comprising guides carried by said truck and coöperating guide controlled elements carried by said rake bars, said guides having horizontal straight line portions serving to move the heads of said rake bars horizontally over the ground.

2. In a machine of the kind described, the combination with a truck and movable rake bars carried thereby, of means for reciprocating said rake bars, comprising guides carried by said truck and coöperating guide controlled elements carried by said rake bars, said guides having horizontal straight line portions serving to move the heads of said rake bars horizontally over the ground, and said guides having pivoted switch plates operating substantially as described.

3. In a loader of the kind described, the combination with an inclined deck and coöperating toothed rake bars connected in sets and having studs, of means for reciprocating said rake bars, and endless runways and coöperating switch plates having approximately horizontal straight line portions arranged for action on said studs, to move the lower ends or heads of said rake bars horizontally over the ground, thence upward, and thence downward with a movement away from said deck into reëngagement with the ground.

4. In a loader of the kind described, the combination with a truck having traction wheels and an inclined deck, of endless runways and coöperating switch plates carried by the lower portions of said deck and both having approximately horizontal straight line portions, rake bars connected in two sets and working over said deck, said two sets of rake bars having laterally spaced arms with cam studs guided by the coöperating runways and switch plates, and connections between said traction wheels and said two sets of rake bars for reciprocating said two sets of rake bars in alternate order.

5. In a loader of the kind described, the combination with a truck having traction wheels and an inclined deck, of endless runways and coöperating switch plates carried by the lower portions of said deck and both having approximately horizontal straight portions, rake bars connected in two sets and working over said deck, said two sets of rake bars having laterally spaced arms with cam studs guided by the coöperating runways and switch plates, wheels having cam studs driven by said traction wheels, levers guided by said cam studs, and rods connecting said levers to the said two sets of rake bars.

6. In a loader of the kind described, the combination with a truck having traction wheels and an inclined deck, of endless runways and coöperating switch plates carried by the lower portions of said deck and both having approximately horizontal straight line portions, rake bars connected in two sets and working over said deck, said two sets of rake bars having laterally spaced arms with cam studs guided by the coöperating runways and switch plates, connections actuated by said traction wheels for reciprocating said two sets of rake bars in alternate order, wheels having cam studs driven from said traction wheels, pivoted levers carried by said truck, and rods connecting the said levers to the two sets of rake bars, the said levers having cam surfaces and retracting flanges guided by some of the said cam studs, substantially as described.

7. In a loader of the kind described, the combination with a truck having traction wheels and an inclined deck, of endless runways and coöperating switch plates carried by the lower portions of said deck and both having approximately horizontal straight line portions, rake bars connected in two sets and working over said deck, said two sets of rake bars having laterally spaced arms with cam studs guided by the coöperating runways and switch plates, connections between said traction wheels and said two sets of rake bars for reciprocating said two sets of rake bars in alternate order, independently connected inner and outer pivoted levers carried by said truck and independently connected to said two sets of rake bars, and cam wheels carried by said traction wheels and having inner and outer cam studs located circumferentially, one ahead of the other, and alternately engageable with the ground surface, respectively, of said inner and outer levers, substantially as described.

8. In a loader of the kind described, the combination with a track having traction wheels and an inclined deck, of endless runways and coöperating switch plates carried by the lower portions of said deck and both having approximately horizontal straight line portions, rake bars connected in two sets and working over said deck, said two sets of rake bars having laterally spaced arms with cam studs guided by the coöperating runways and switch plates, connections between said traction wheels and said two sets of rake bars for reciprocating said two sets of rake bars in alternate order, inner and outer pairs of pivoted levers carried by said truck and independently connected to the said two sets of rake bars, said levers having cam surfaces and retracting flanges, and cam wheels carried by said truck wheels and provided with diametrically opposite inner and outer cam studs alternately engageable in succession with the cam surfaces of retracting flanges of said levers, substantially as described.

In testimony whereof we affix our signatures in presence of two witnesses.

MYRON G. HARRIS.
NEILS P. RASMUSSON.
WILLIAM C. INGLETHRON.

Witnesses:
 EARLE L. BROWN,
 EARL W. GRANGER.